UNITED STATES PATENT OFFICE.

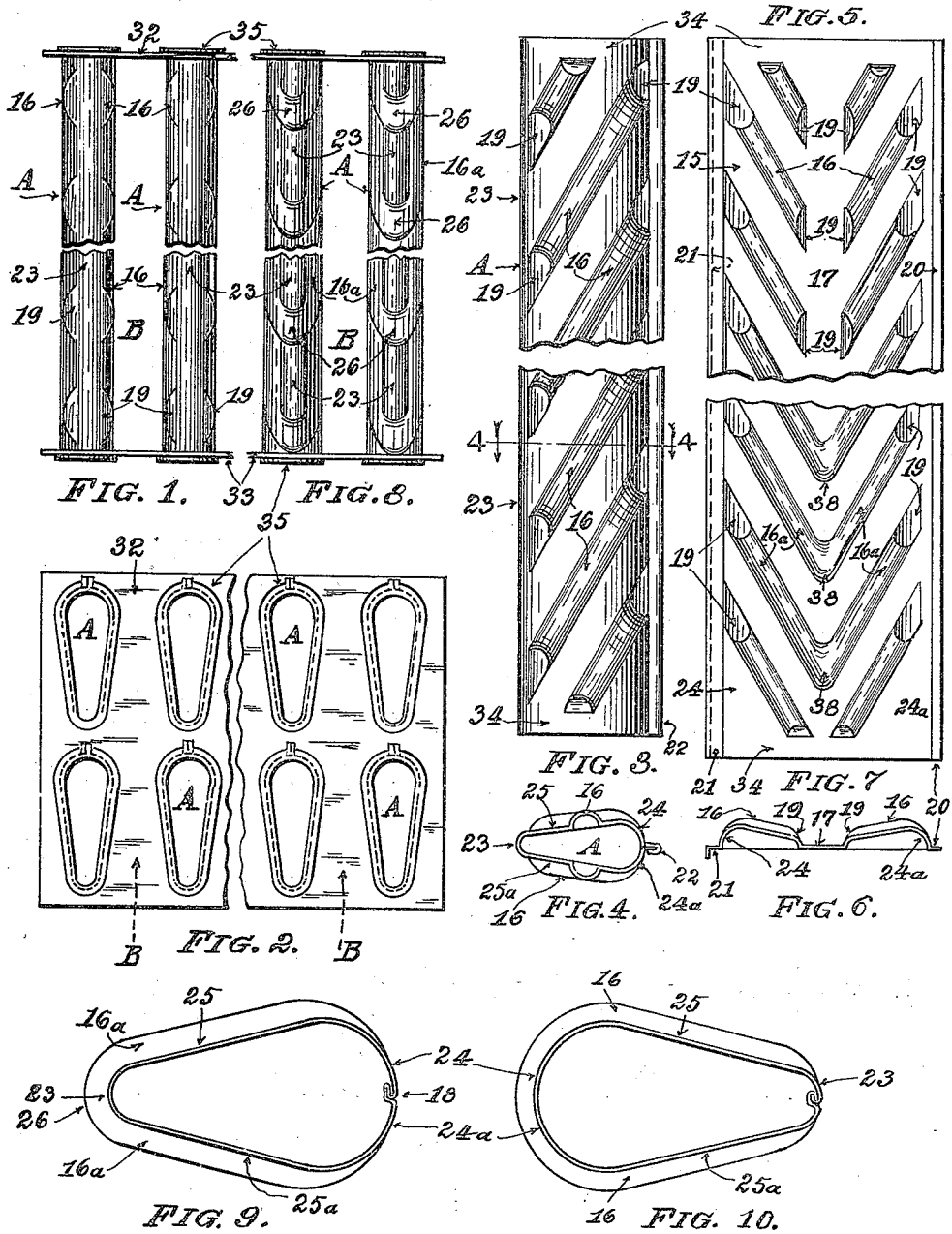

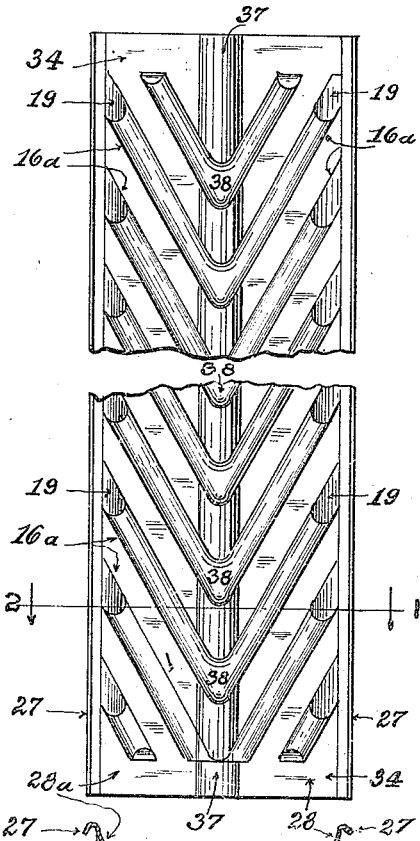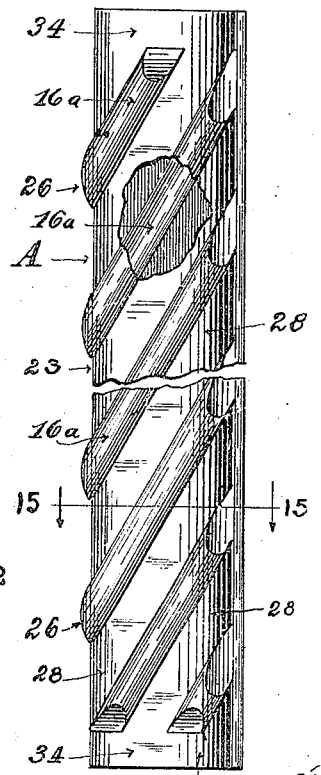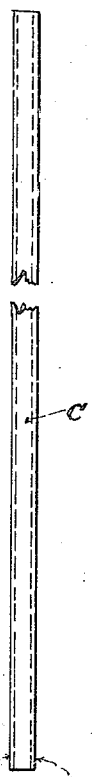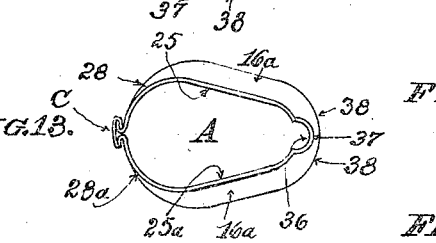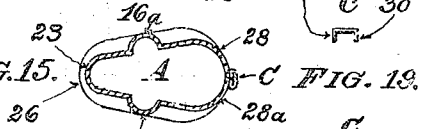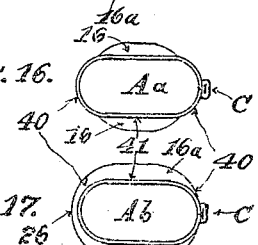

CHARLES F. SPERY, OF CHICAGO, ILLINOIS.

RADIATOR FOR MOTOR VEHICLES.

1,422,315.   Specification of Letters Patent.   Patented July 11, 1922.

Application filed November 25, 1919. Serial No. 340,635.

*To all whom it may concern:*

Be it known that I, CHARLES F. SPERY, a citizen of the United States, and resident of the city of Chicago, in the county of Cook and State of Illinois, have invented certain new and useful Improvements in Radiators for Motor Vehicles; and I do hereby declare that the following description of my invention, taken in connection with the accompanying sheets of drawings, form a full, clear, and exact specification, which will enable others skilled in the art to which the said invention appertains to make and use the same.

This invention has general reference to improvements in radiators for internal combustion engines to reduce the temperature of the water employed in keeping the engine cylinders at a proper working temperature; and it consists, essentially, in the novel and peculiar combination of parts, and details of construction, as hereinafter first fully set forth and described, and then pointed out in the claims.

The object of this invention, generally speaking, is the production of a serviceable, durable, and highly efficient radiator for internal combustion engines. In this class of radiators, vertically disposed water tubes are employed, which water tubes are generally provided with laterally extending fins, serving as heat conductors, the whole being of cellular construction, the spaces between the water tubes and occupied by the cooling fins being air conduits through which air is forced to reduce the temperature of the metallic surfaces thereto exposed and thus, by convection, reduce the temperature of the water passing through the tubes. In my present invention, I construct a water tube having an oblong cross section, preferably of pear-shape, the narrower of the two longitudinal edges of the tube being at the front of the radiator, while the wider longitudinal edge is at the rear thereof, so that the sides of adjacent water tubes converge and approach each other toward the rear of the radiator, whereby the current of air entering the air conduit is compressed, as it were, as it passes through the conduit to come into more intimate contact with the walls of the tube, resulting in a more effective cooling of the water in its downward passage through the water tubes. And in order to still further augment the cooling effect of the air, I provide the water tubes with protuberances formed integrally with the tubes, as hereinafter more fully described.

In the drawings forming a part of this specification—Figure 1 is a front elevation of an associated pair of water tubes constructed in accord with my invention. Fig. 2 is a plan of a tube-plate in which a multiplicity of water tubes are secured. Fig. 3 is a side elevation of one of the water tubes detached. Fig. 4 is a sectional view on line 4—4 of Fig. 3. Fig. 5 is a plan of the blank for a water tube prior to its being formed into a tube. Fig. 6 is an end view of the same. Fig. 7 is a plan of a blank for a water tube slightly modified. Fig. 8 is a front elevation of a tube formed from this blank. Fig. 9 is a diagrammatic view of a water tube showing the interlocked marginal edges of the tube located at the wider part thereof; and Fig. 10 is a similar view showing the locked seam at the narrower part of the tube. Fig. 11 is a plan view of a blank for a water tube, illustrating further modifications of the construction of these tubes. Fig. 12 is a sectional view of the latter tube on line 12—12 of Fig. 11, and illustrating the first step in the production of this tube. Fig. 13 is an end view of an ovate tube showing rather diagrammatically, the shape of the tube and the locking means employed therein. Fig. 14 is a side elevation of the completely formed tube made from the blank illustrated in Fig. 11. Fig. 15 is a transverse sectional view on line 15—15 of Fig. 14. Figs. 16 and 17 are diagrammatic views of an elongate ovate tube embodying my invention. Fig. 18 is an elevation of a strip of metal employed in locking the seam in the water tubes. Fig. 19 is an end view of the same; and Fig. 20 a similar view showing the locking strip bent, ready for use.

Like parts are designated by the same characters and symbols of reference in all the various figures.

A, in Figs. 1 and 2, designate a series of water tubes constructed in accord with my invention. These water tubes are produced from a strip or ribbon of sheet metal, shown in Fig. 5, of proper width, length, and thickness. This ribbon 15, is placed between suitable dies or rolls and therein impressed with a series of obliquely disposed protuberances or projections 16, on one side thereof, which protuberances accord correspondingly shaped grooves or depressions on the opposite side of the blank. These protuberances 16 are approximately semicircular in cross section; and they are arranged in spaced apart relationship at angles of approximately 30 degrees to the margins of the blank, so that there is a flat space or land 17, between each pair of these protuberances. These protuberances extend from the longitudinal center portion 17 in opposite direction, but when this blank is doubled up these protuberances run in the same direction, as indicated in Fig. 14, the ends of these protuberances 16 being pronouncedly flattened as at 19, to merge in the central portion and in the longitudinal margins thereof. The outer longitudinal margin of this ribbon is flat, as at 20, Fig. 6, but the other margin has a wider flat portion which is bent at approximately right angles, as at 21, said flat margin 20 and the right-angled margin 21, affording, when the blank is rolled to tubular form, a lock-seam 22, as illustrated in Figs. 3 and 4. This blank is then rolled or pressed to tubular form with the central portion 17 forming the narrow longitudinal edge 23, and the two marginal portions 24, 24$^a$, forming the wider part of the tube, with the sides 25, 25$^a$, converging as shown in Fig. 4. In this condition, the right-angular portion 21 is bent over the flat portion 20 of the marginal edges of the tube to form a standing lock seam 22; but if desired, this locked portion may be turned upon itself as illustrated in Fig. 9 at 18; and if found desirable, this locked seam may be forced into the interior of the tube so that the exterior surface at this seam is perfectly smooth.

A modified form of construction of this water tube is shown in Fig. 7. In this instance the inclined protuberances 16$^a$, merge into each other at the longitudinal center of the blank, as at 38, so that, after the blank is brought into tubular form, the protuberances 16$^a$ will pass around the narrower margin of the tube, as shown in Figs. 8, and 14, and as diagrammatically indicated in Fig. 9, whereby these corrugations 16$^a$, may be seen from the front of the tube.

In Fig. 11, I have illustrated a blank for a water tube substantially the same as the one shown in Fig. 7, except that both longitudinal margins are bent approximately at right angles to the plane of the blank, as indicated at 27, so that these bent portions afford hooks to form one element of the locked seam depicted in Fig. 13, at C. This blank when being formed into a tube, is bent through its longitudinal center to afford the narrower edge or portion 23, of the tube, and its longitudinal margins 28, 28$^a$, formed to afford the wider edge portion, but without closing this wider edge. To close this wider edge, I provide an element C, shown in Figs. 18, 19, and 20, said element C being a metallic ribbon of proper width and length, having its longitudinal margins first bent at right angles, as at 30, Fig. 19, and then inwardly bent, as at 31 in Fig. 20. This element C is then pushed over the hooks 27 of the tube, as indicated in Fig. 13, and the engaging margins closed and pressed together to form a double lock.

A multiplicity of these water tubes is passed with their upper and lower ends 34, into plates 32, 33, either in single or multiple rows, as illustrated in Figs. 1, 2, and 8, and then the projecting terminals 34 of the tubes turned flat upon the plates, as indicated at 35, in these figures, and then soldered to these plates to integrally connect them thereto.

The tubes having the inclined protuberances 16$^a$ passing around the narrower edge thereof, as illustrated in Figs. 7 and 15, when the curvature of these edges are rather pronounced, can be readily bent without crushing or flattening the protuberances around these narrow edges 23; but where the tubes are of comparatively small area, and the forward edge 23 rather narrow, I form in the longitudinal center of the blank a gutter 36, Fig. 12, which gutter on the opposite face of the blank forms a longitudinal, rounded, projection 37, Fig. 13, which projection has approximately the curvature of the narrow edge 38, see Fig. 12, so that, when bending this blank to tubular form, the meeting portions 38 of the protuberances 16$^a$, which thereby become rather shallow at this point, will readily bend without flattening, it being understood that the metal of the tubes is rather thin and varies between 26 and 32 of the B. & S. gage, according to the size of the tube in question.

While I have designed, and prefer, the tubes having the pear-shaped cross section, for reasons which I shall hereinafter explain, I do not wish to confine myself to this contour of the tubes; and in Figs. 16 and 17, I have illustrated tubes of the elongate ovate type, said tubes having rounded ends 40, and parallel sides 41, one of the ends being locked by the locking device C, hereinbefore described. These tubes A$^a$, and A$^b$, are provided with the inclined protuberances 16, as shown in Fig. 16, which stop short of the front and rear edges, or with the protuberances 16$^a$, which pass around one of the edges of the tube, as shown in Fig. 17.

Attention is now invited to Figs. 1, 2, and 3, which show the arrangement of the water tubes in relation to one another. Thus air enters the spaces B between adjacent tubes at the narrow edges thereof which are in front of the radiator core, and passes between the tubes; but since this space becomes narrower toward the rear of the tubes, the speed of the air entering between the tubes will gradually increase until it reaches its highest speed at the narrowest point of the passage. The velocity is then quickly reduced as the air enters the large space between the front and rear tubes, whereupon it again increases its velocity. Within said large space the air becomes thoroughly mixed. The result of this construction is that the air passing through the radiator is turned over and divided so that nearly all of the air comes in direct contact with the metal of the tubes, so that, instead of a thin film of air only absorbing heat, a structure is presented where substantially all the air passing through absorbs some heat. Without the long narrowing passages and the intermediate large chamber such results would not be possible in a structure of this type. In passing through these air conduits B, the air encounters the sharply inclined protuberances on the water tubes, which will cause the air near the sides of the tubes to take an upward course, which current opposes the downwardly moving water current in the tubes and thereby still further augments the cooling effect of the air in its passage through the air conduits B. Thus these inclined protuberances serve the purposes of increasing the cooling area of the tubes, serve as reinforcements to the walls of the tubes, and cause a partial upward and rearward movement of the air in passing through the air conduits, which latter result produces a thorough intermixing, as it were, a churning and agitating of the air. At the same time these protuberances form in the water passages pockets which have the effect of slightly retarding the flow of water through the tubes and the water will thereby be somewhat longer subjected to the cooling effect of the walls of the tubes.

Having thus fully described this invention, I claim as new, and desire to secure to myself by Letters Patent of the United States—

1. A radiator core, comprising a plurality of transverse series of vertically disposed, spaced apart, water tubes arranged in alinement from front to rear, said water tubes having a tapering transverse sectional contour and having rounded edges, the narrower part of the tubes being at the front of the core, the spaces between adjacent water tubes affording air conduits of gradually decreasing width, there being in the converging walls of said tubes outwardly projecting diagonal protuberances to increase the cooling area of said tubes.

2. A radiator core, comprising a multiplicity of vertically disposed, spaced apart, water tubes, said water tubes having a tapering transverse sectional contour and having rounded edges, the narrower part of the tubes being at the front of the core, the spaces between adjacent water tubes affording air conduits of gradually decreasing width, there being in the converging walls of said tubes outwardly extending protuberances to increase the cooling area of said tubes, said protuberances being sharply inclined to direct the air entering the air conduits upwardly therein.

3. In a radiator core, a vertical series of alined water tubes, each water tube being of oblong transverse sectional contour, and having a vertical seam at the front and rear, there being in the walls of said tube spaced apart, sharply inclined, semicircular protuberances extending all around the tube from the seam to the seam, the inclination of said protuberances being in an upward direction to cause air passing said protuberances to take a course in a direction opposed to that in which water in said tube moves in its passage through said tube.

4. In a radiator core, a water tube, said water tube being of tapering transverse sectional contour, the narrower longitudinal edge of said tube being at the front of said core, there being in the side walls of said tube sharply inclined protuberances, said protuberances inclining in the same direction on both sides of the tube, said protuberances passing around the narrower longitudinal edge of said tube.

5. In a radiator core, a water tube, said water tube being formed of a metallic blank or ribbon, said ribbon having its longitudinal margins formed to afford members of a locking seam, there being in the said blank spaced apart, sharply inclined, protuberances in parallel spaced relationship extending continuously from one margin down one side around the edge and up the other side to the other margin, the longitudinal margins of said blank being curved to afford one longitudinal edge of said tube, the longitudinal central portion of said blank being curved to afford the other longitudinal edge of the tube, the longitudinal margins of said blank being locked to afford a closed seam for said tube when formed.

6. In a radiator of the nature described, a water tube, said water tube being formed of a metallic blank, said blank having its longitudinal margins formed to hook shape, there being in the said blank spaced apart, sharply inclined, protuberances in parallel spaced relationship extending continuously from one margin down one side around the edge and up the other side to the other margin, the longitudinal margins of said blank being curved to afford one longitudinal edge of said tube, the longitudinal central portion of said blank being curved to afford the other longitudinal edge of said tube, and means for connecting the meeting longitudinal margins to afford a locked seam for said tube when formed.

7. In a radiator core, a water tube, said water tube being formed of a sheet metallic blank, said blank having its longitudinal margins hook-shaped, said blank being bent to afford an oblong tube with the marginal hooks in adjacency and made with diagonal protuberances extending from one margin around the curved edge of the tube and back to the other margin, and an element passed over and engaging said hooks which when compressed to bring the metallic members in close contact with one another affords a closed locked seam for said tube.

8. A radiator core having aligned front and rear tubes of pear-shaped cross-section in uniformly spaced relation, whereby passages are provided having a center space, a funnel shaped channel leading into said space from the front and a similar passage leading to the rear, and inclined protuberances in said passages for directing the passing air upward along the sides of the tubes.

In testimony that I claim the foregoing as my invention, I have hereunto set my hand.

CHARLES F. SPERY.